Figure 1:
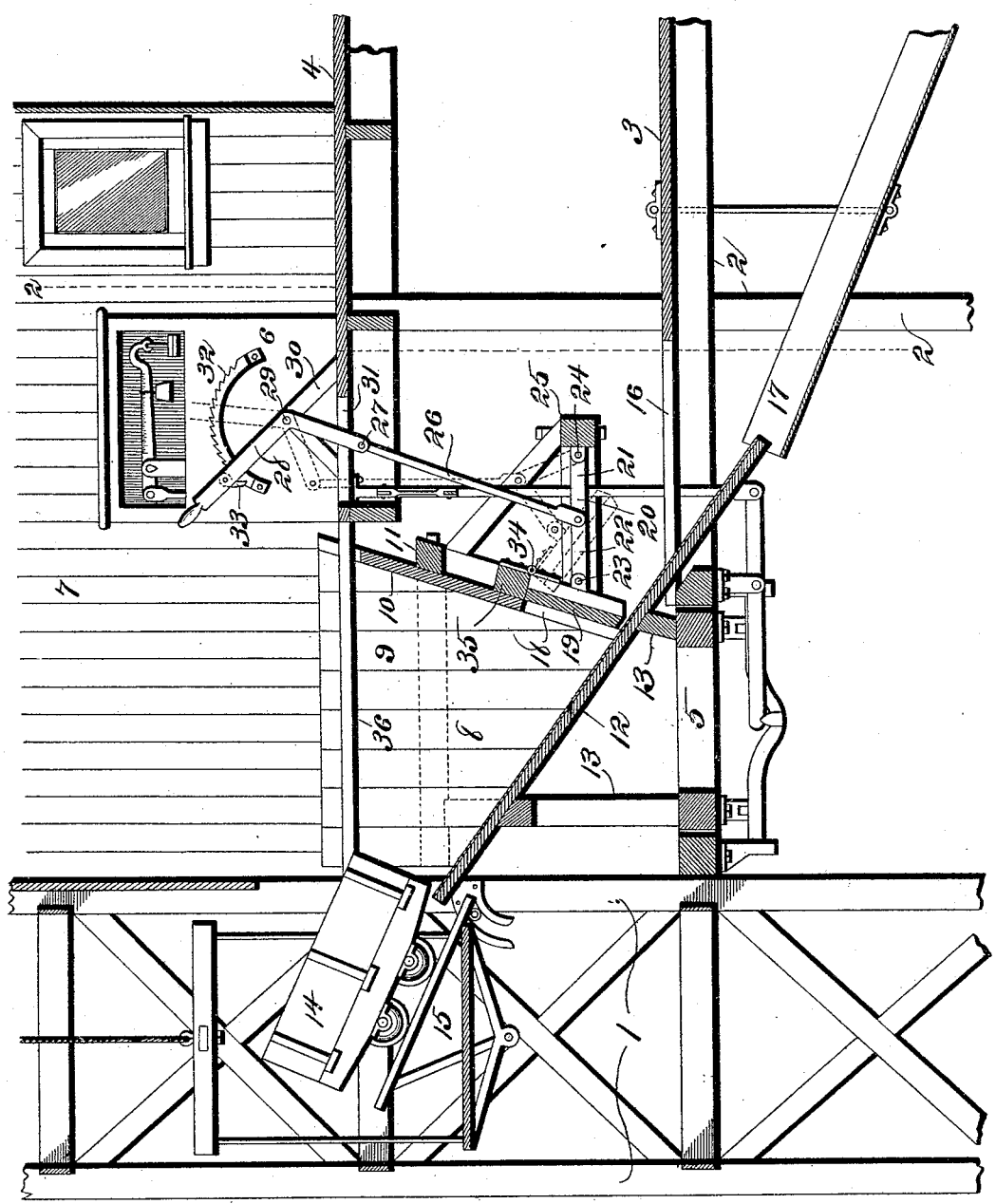

(No Model.) 2 Sheets—Sheet 1.

F. W. BOND.
WEIGH HOPPER FOR PLATFORM SCALES.

No. 523,454. Patented July 24, 1894.

Witnesses:
W. J. Dankey
M. P. Smith

Inventor:
Frederick W. Bond
by Higdon Higdon Longan
Attys.

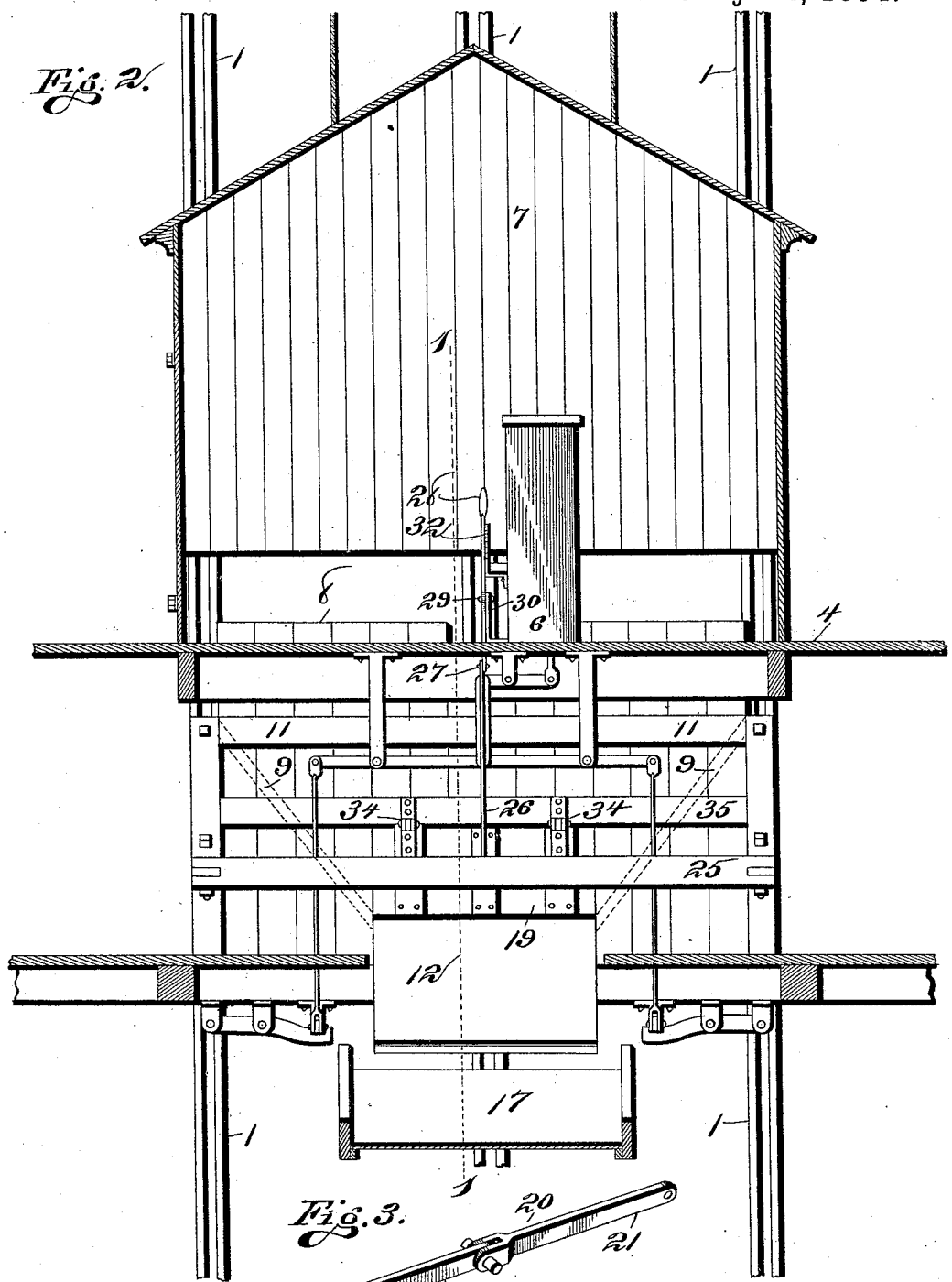

UNITED STATES PATENT OFFICE.

FREDERICK W. BOND, OF ST. LOUIS, MISSOURI.

WEIGH-HOPPER FOR PLATFORM-SCALES.

SPECIFICATION forming part of Letters Patent No. 523,454, dated July 24, 1894.

Application filed February 5, 1894. Serial No. 499,162. (No model.)

*To all whom it may concern:*

Be it known that I, FREDERICK W. BOND, of the city of St. Louis, State of Missouri, have invented certain new and useful Improvements in Weigh-Hoppers for Platform-Scales, of which the following is a full, clear, and exact description, reference being had to the accompanying drawings, forming a part hereof.

My invention relates to an improved weigh hopper, and consists in the novel construction, combination and arrangement of parts hereinafter described and designated in the claim, and illustrated in the accompanying drawings, in which—

Figure 1 is a vertical section of my improved weigh hopper, showing its connection with a scale and the frame work of an ordinary mine, said section being taken on the line 1—1 of Fig. 2. Fig. 2 is a vertical section of the frame work which supports the scale and hopper, and showing a front elevation of my improved weigh hopper. Fig. 3 is an enlarged perspective view of a locking device, which is made use of in carrying out my invention.

The object of my invention is to construct a hopper to be applied to an ordinary scale platform, and be so located in connection with the tower posts of an ordinary coal shaft that coal can be dumped direct from the pit-cars into said hopper.

A further object of my invention is to construct a hopper with the bottom at an incline and a door in one side adjacent said bottom, so that when coal is dumped into the hopper it cannot pass through said hopper until it has been weighed and the door opened.

Referring to the drawings: the numeral 1 designates the tower posts of an ordinary coal shaft, and 2 the frame work which supports the scales upon which my improved hopper is located. This frame work 2 is constructed with two platforms 3 and 4, the platform 3 being the lower one, the scale platform 5 is located therein and the beam-box 6 is located on the platform 4. A suitable inclosure 7 is formed around the beam-box, so that the operator in charge of the weighing and operating of the hopper will not be exposed to the weather. The scale platform 5 being mounted on beam-levers of ordinary construction, the description of the same will be omitted. Suitable extension levers lead from said beam-levers to the weighing beam which is located in the beam-box 6. These can be of any ordinary construction, and located in the most convenient and practical manner.

8 indicates the weigh hopper, which is now to be described. Said hopper is constructed of two outwardly flaring ends 9 and one flaring side 10. These ends and side being constructed of suitable plank, they are held in position by frame work 11, which is supported and carried by the scale platform 5 independent of the frame work 2 and the platform 3.

12 indicates the bottom of the hopper, which is supported at an angle upon the scale platform 5 by suitable timbers 13. This bottom is so constructed that the upper end will be adjacent the tower 1, so that when coal is brought up from the shaft in a pit-car, such as 14, upon an automatic dumping cage 15, the coal discharged from said car will fall upon the bottom 12 into the hopper 8, the adjacent end of the hopper 8 being open so that the pit-cars will not come in contact therewith. The lower end of the bottom 12 projects outward from the side 10 and through a suitable opening 16 in the platform 3, so that a chute, such as 17, can be provided for carrying the coal off as it is discharged from the lower end of the inclined bottom 12. A suitable opening 18 is formed in the side 10 adjacent the bottom 12, and this opening is closed by a door 19. The purpose of this door is to close the opening 18 and prevent the coal from passing through the hopper before it has been weighed. For operating and locking this door, I have constructed the device now to be described.

20 indicates a bar, which is constructed of two mating links 21 and 22, they being pivoted together at one end, and the opposite end of the link 22 being pivoted to a suitable perforated ear 23 which is connected to the adjacent side of the door 19, and the opposite end of the link 21 is pivoted to a suitable perforated ear 24 carried by a stationary cross-timber 25. This cross-timber 25 is supported by suitable braces and frame work carried by the frame work 11 of the hopper 8. One end of a bar 26 is pivoted to the meeting ends of the links 21 and 22, and the opposite end of said bar is pivoted at 27 to a hand-lever 28, which is fulcrumed at 29 to a suitable bracket 30, connected to the upper side of the platform 4. A suitable opening 31 is formed in the platform 4 to allow the lower end of the hand-lever 28 to be manipulated without coming in contact with said platform. A toothed-segment 32 is connected to the adjacent side of the beam-box 6 in such a manner that it can be engaged by a pawl 33 carried by the hand-lever 28.

The door 19 being hinged at its upper end by means of hinges 34 to a horizontal timber 35, carried by the side 10, it can readily be seen that by drawing the lever 28 back, as illustrated by dotted lines in Fig. 1, the bar 26 will draw up on the adjacent end of the links 21 and 22 of the bar 20, which will cause said bar to double at this point, and the pivoted end of the link 21 being stationary and the pivoted end of the link 22 being pivoted to the door 19, it will cause said door to be drawn open, as illustrated by dotted lines in Fig. 1, which will allow the coal to pass from said hopper, it being weighed before this operation occurs. When the lever 28 is drawn back to the position illustrated by dotted lines in Fig. 1, the pawl 33 will engage the toothed-segment 32 and retain said lever in the required position until released by the operator.

36 indicates a running-board, which extends outward in horizontal alignment with the platform 4 over the hopper 8, and is connected to the tower posts. This running board is to allow the operator in charge of the hopper to walk out over said hopper and take the tags from the pit-cars as their contents are dumped into the hopper. By so doing it enables the operator in charge to keep a record of each miner's coal separate as it is weighed.

In case it is not desired to weigh the coal, the door 19 can be thrown open, as illustrated by dotted lines in Fig. 1, which will allow the coal as it is discharged from the pit-cars onto the inclined bottom 12 of the hopper to pass through said hopper onto the chute 17.

What I claim is—

In combination with a scale platform, a hopper having an inclined bottom, outwardly flaring ends and side, said side constructed with an opening adjacent said inclined bottom, a door hinged at its upper end to a timber carried by said side, a bar for locking and operating said door constructed of two mating links 21 and 22 pivoted together at one end, the opposite end of the link 22 being pivoted to the door, the opposite end of the link 21 being pivoted to a stationary timber carried by said hopper, and a bar pivoted to the adjacent ends of said links, the opposite end of said bar being pivoted to a hand-lever, all arranged and combined to operate in the manner herein specified.

In testimony whereof I affix my signature in presence of two witnesses.

FREDERICK W. BOND.

Witnesses:
EDWARD E. LONGAN,
JNO. C. HIGDON.